Sept. 25, 1951        C. A. BAILLOD        2,568,977
AUTOMATIC TRAVERSE STOP AND TOOL RETRACTOR
Filed Sept. 16, 1946        2 Sheets-Sheet 1
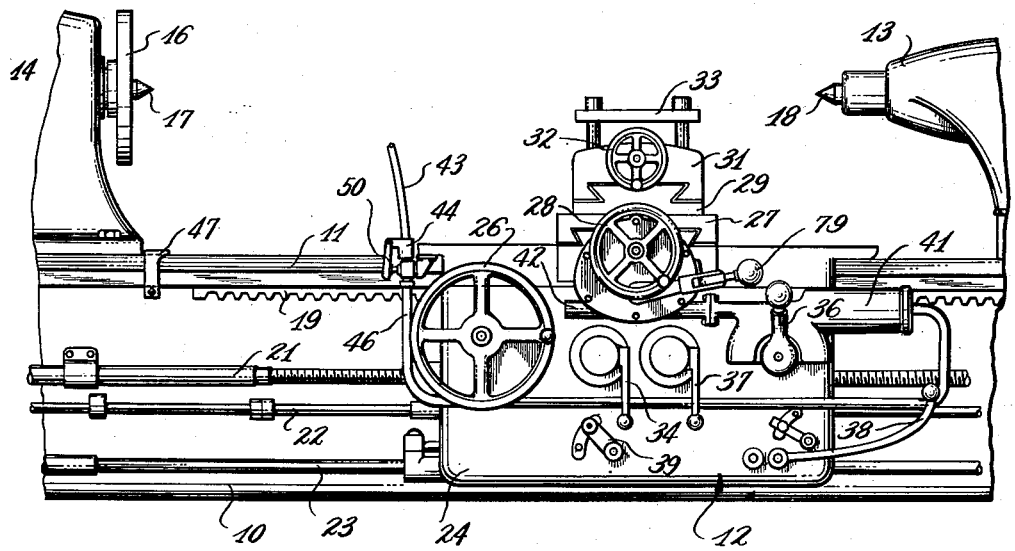
INVENTOR
CHARLES A. BAILLOD
by Harold W. Mattingly
ATTORNEY Sept. 25, 1951         C. A. BAILLOD         2,568,977

AUTOMATIC TRAVERSE STOP AND TOOL RETRACTOR

Filed Sept. 16, 1946         2 Sheets-Sheet 2

INVENTOR
CHARLES A. BAILLOD
by Harold W. Mattingly
ATTORNEY

Patented Sept. 25, 1951

2,568,977

UNITED STATES PATENT OFFICE 2,568,977

AUTOMATIC TRAVERSE STOP AND TOOL RETRACTOR

Charles A. Baillod, Bell Gardens, Calif.

Application September 16, 1946, Serial No. 697,327

5 Claims. (Cl. 82—21)

My invention relates to lathes, and more particularly to an automatic mechanism for stopping the carriage of a lathe and simultaneously retracting a cutting tool, and has particular utility for thread cutting operations wherein the thread terminates at the outer surface of a workpiece, at a shoulder, or at any other predetermined spot where a thread relief is not used.

Lathes constructed at present must be closely attended to insure accuracy of the termination of cuts at non-relieved portions on workpieces. While automatic stops have been provided for lathe carriages, these stops do not adequately serve the purpose for terminating thread cutting operations at surfaces or shoulders upon the workpiece. In the cutting of such threads on a lathe, in addition to stopping the carriage, it is necessary that the tool be swiftly retracted to prevent cutting away the threads as the workpiece rotates. This thread cutting at surfaces or shoulders has heretofore required an especially alert lathe operator who could simultaneously stop the carriage and retract the tool.

My invention provides means for stopping a lathe carriage and simultaneously retracting the cutting tool very rapidly. While it has particular utility for thread cutting operations that terminate at non-relieved portions, it is equally well adapted for other lathe cutting operations that terminate at shoulders, particularly if it is desired to finish the shoulder at a single setting of the cutting tool. In the presently preferred form of my invention the entire mechanism for accomplishing these ends is located on the lathe carriage, and accordingly the invention will be described with reference to this apparatus. It will be appreciated, however, that the mechanism could be otherwise disposed for effecting these ends.

It is a general object of the invention to provide a lathe wherein the lathe carriage may be automatically stopped and the cutting tool simultaneously and automatically retracted.

Another object of my invention is to provide a power-driven carriage stop and tool retracting mechanism.

Still another object of my invention is to provide a lathe carriage having automatic mechanisms secured thereto for stopping the carriage and simultaneously retracting the cutting tool.

Still another object of my invention is to provide a mechanism for a lathe which mechanism automatically handles the cutting operation for forming threads that terminate at a surface, shoulder, or other predetermined place along the workpiece.

Still a further object of the invention is to provide a mechanism for a lathe which cuts either left- or right-hand threads for automatically stopping the carriage and retracting the cutting tool whereby threads may be properly cut when they terminate at a non-relieved portion on a workpiece.

Other objects and advantages of my invention will be apparent in the following description and claims, considered together with the accompanying drawings forming an integral part of this specification, and in which Fig. 1 is an elevation view of portions of a lathe wherein the lathe carriage is equipped with a mechanism embodying the invention;

Fig. 2 is an elevation sectional view of the mechanism of my invention that is attached to the lathe carriage of Fig. 1;

Figure 3:
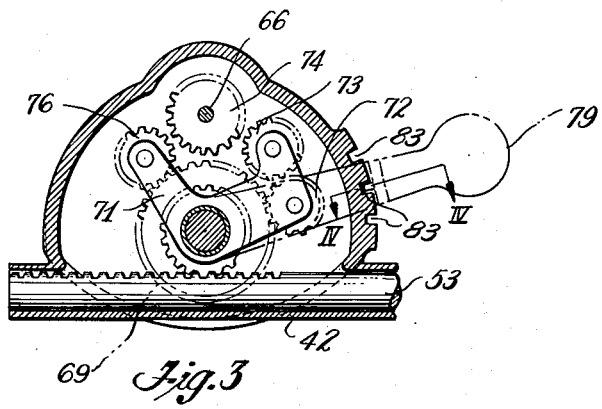
Fig. 3 is a view similar to the left-hand part of Fig. 2 showing the gearing for retracting the tool in a neutral position.
Figure 4:
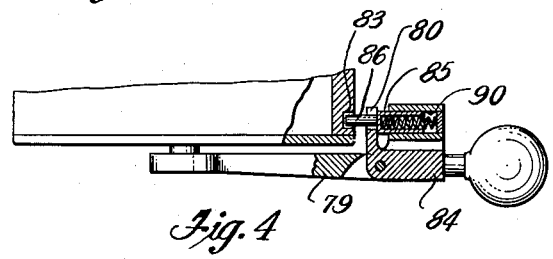
Fig. 4 is a detail sectional view of the automatic stop mechanism for the gear arrangement of Fig. 3 taken along the line IV—IV of Fig. 3.

Referring to Fig. 1, a lathe bed 10 may have ways 11 formed on the upper surface thereof upon which may slide a lathe carriage 12 and a tailstock 13. A headstock 14 may be suitably secured to the lathe bed 10 and may have a drive plate 16 and a center 17 mounted thereon for driving rotation. Any suitable workpiece may be disposed between the headstock center 17 and a tailstock center 18, and may be rotated by a driving engagement (not shown) with the drive plate 16. In this connection it should be noted that the tailstock is secured to the ways 11 during any cutting operation, but may be released to allow a sliding along the ways 11 for inserting a workpiece of different length between the centers 17 and 18.

The lathe carriage 12 is adapted to move along the lathe bed and has portions moving across the lathe bed for properly applying a tool to a rotating workpiece. The traverse movement of the carriage along the ways may be either manually driven or may be power driven, and likewise the cross feed for the tool may be either manually driven or power driven. Accordingly the lathe bed 10 is provided with a rack 19 for engagement with a manually driven gear for movement of the carriage along the ways, and may be provided with a lead screw 21 for accurately moving the carriage at a fixed ratio to the rotational speed of the drive plate 16 such as is desired for cutting accurate threads in a workpiece. Additionally, the lathe may be provided with a rotating feed rod 22 for moving the carriage on the ways when accuracy is not required and when the saving of wear upon the lead screw is desired. Also the lathe may be provided with a control rod 23 which may be manually rotated at the carriage 12 for reversing the direction of rotation of either the lead screw 21 or the feed rod 22.

Still referring to Fig. 1 it will be noted that the carriage 12 may be provided with the customary apron 24 upon which is disposed a carriage hand wheel 26 for manually moving the carriage on the ways by engagement with the rack 19, and may be provided with a cross slide 27 that may be moved across the ways 11 by a cross feed hand wheel 28. Disposed on the cross slide 27 may be a compound 29 upon which may be disposed a compound slide 31 which may be disposed at any angle with respect to the cross slide 27 and which may be moved by means of a hand wheel 32. The compound slide 31 may retain any suitable tool post 33 in which may be disposed a tool for cutting threads or otherwise forming metal disposed between the centers 17 and 18. The carriage may be power driven on the ways 11 either by engaging the lead screw 21 or the feed rod 22, both of which may pass through the apron 24. The movement by means of the feed rod 22 may take place by manually operating a clutch lever 34, and alternatively the movement of the carriage by the lead screw 21 may take place by operating a hand lever 36 which causes a split nut to clamp about the lead screw 21. The cross slide 27 may also be power driven by manually moving a clutch lever 37, which causes the feed rod 22 to drive the cross slide. The direction of rotation of the lead screw 21 and the feed rod 22 may be reversed by manual operation of a control rod lever 38 which causes rotation of the control rod 23 to actuate a gear shift or other reversing mechanism (not shown). The lathe may be provided with any suitable gear shift mechanism to give any desired range of feed ratio drives between the drive plate 16 and the lead screw 21. Also the speed of movement of the carriage 12 by means of the feed rod 22 may be changed by operating a gear shift lever 39 on the apron 24.

The mechanism thus far described is generally that which is old and well-known in the art. The apron 24, however, may be provided with a housing 41 disposed generally about the split nut lever 36, which housing is made particularly in accordance with the invention. The apron 24 may also carry a housing 42 secured to the housing 41 which is also made particularly in accordance with the invention and disposed generally about the cross feed hand wheel 28. A conduit 43 for fluid under pressure may be connected to a valve 44 secured to the left end of the carriage 12 to which may be secured a conduit 46 leading from the valve 44 across the apron 24 of the carriage to the right-hand end of the housing 41. The valve 44 controls the flow of motive power to the mechanism of the invention, and may be actuated when the carriage moves to the left sufficiently to engage an adjustable stop actuator 47 with a lever 50 mounted on the valve 44 to give snap action to the valve.

The housings 41 and 42 are shown in more detail in Fig. 2, wherein it will be noted that the housing 41 has a cylinder cavity 48 formed therein in which is disposed a piston 49 and which has the outer end closed by a cap 51 which also receives the fluid conduit 46. The housing 41 also has a concentric piston rod bore 52 formed thereon in which may be disposed a piston rod 53 suitably connected to the piston 49. The air at the left of the piston may exhaust through the piston rod bore 52 to atmosphere until a seal 54 on the piston rod 53 closes this opening, trapping air to the left of the piston 49, creating a dash pot effect. The housing 41 also has formed thereon a generally semi-circular portion 56 in which may be disposed a gear sector 57 secured in any suitable manner to the split nut shaft 58 on which the lever 36 is also disposed for rotation. The sector 57 may have a projecting pin 59 which may be engaged by shoulders 61 or 62 formed upon the split nut lever 36 when the lever is manually rotated. The piston rod 53 may have rack teeth 63 formed thereon for engaging the gear sector 57.

Figure 5:
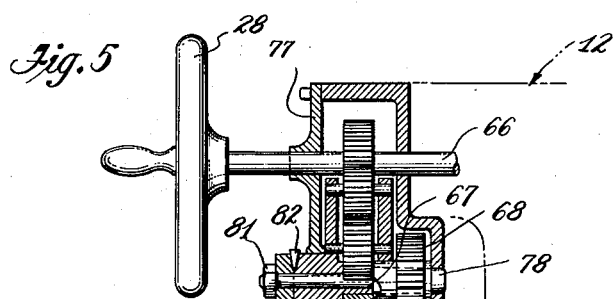
Fig. 5 is a sectional view showing the gearing and lever drive for effectuating the carriage stop and the tool retraction taken along the line V—V of Fig. 2.

The construction of the mechanism for simultaneously actuating the tool retracting mechanism is best understood with reference to Figs. 2 and 5. The purpose of the drive mechanism is to effectuate a gear drive from the piston rod 53 to the shaft upon which the cross feed hand wheel 28 is secured. Accordingly the piston rod 53 is provided with a second set of rack teeth 64 which drives through a series of gears to a cross feed shaft 66 upon which the cross feed hand wheel 28 is secured. While this drive may be accomplished in a variety of forms, at present I prefer to use a double gear having a common shaft 67 upon which is formed a smaller gear 68 and a larger gear 69. The rack 64 engages the smaller gear 68, causing it to rotate and in turn drive the larger gear 69. Inasmuch as the tool retraction must be adapted to either inside or outside thread cutting, the arrangement for driving the cross feed shaft 66 must be reversible. Accordingly I provide a rotatable spider 71 upon which may be mounted a pair of gears 72 and 73, one of which engages the large gear 69 of the double gear, and the other of which is adapted to engage a gear 74 secured to the cross feed shaft 66. Also disposed for rotation on the spider but on an opposite side thereof may be a single spur gear 76 which is always in engagement with the larger double gear 69 and which may be rotated thereabout to engage the cross feed shaft gear 74 as shown in Fig. 2. The spider and the gears mounted thereon may be disposed within the housing 42 by means of a cover plate 77 which may be secured to the housing. The double gear and the spider both ride on a spindle 78 having a reduced section where it passes through the spider member 71. In this connection also it will be noted that the larger double gear 69 also rides partially on the spider 71.

The spider 71 is manually rotatable to give either direction of rotation to the cross feed shaft 66, or may also be disposed in a neutral position where it does not cause a drive to be transmitted to the shaft 66, so that the automatic carriage stop may be operated independently of tool retraction. This structure for manually rotating the handle is best shown in Figs. 2 through 5 inclusive, and may include a handle shank 79 also disposed on the spindle 78 and secured thereon by a nut 81. A driving engagement is obtained between the handle shank 79 and the spider 71 in any suitable form such as by a pin 82 fitting in a common aperture therebetween. Referring particularly to Figs. 2 and 3, it will be noted that three separate apertures 83 are formed on the exterior of the housing 42 to provide selected stops for the manual rotation of the spider 71. Accordingly the handle is provided with a pivoted end member 84 which has a projecting arm 80 adapted to actuate a spring biased plunger 85 secured within a recess 90 within the handle shank 79. The plunger 85 may have a projecting pin 86 adapted to fit within the apertures 83. Thus, as shown in Fig. 2, when the pin is retained within the lower aperture 83 the spider position causes a drive from the large gear 69 through the single spur gear 76 to the cross feed shaft gear 74. When the handle is rotated so that the pin is engaged in the center aperture 83, the gears do not drive the cross feed shaft 66 inasmuch as they are out of engagement with its gear 74, as shown in Fig. 3. When the pin is in the upper aperture 83 the gear pair 72, 73 transmits a drive from the large gear 69 to the shaft gear 74.

The position of the piston rod and its driven gear sector 57 in Fig. 2 is that which is present upon actuation of the mechanism to automatically stop the carriage and retract the tool. When it is desired to re-set the tool to a cutting position, the split nut lever 36 may be manually rotated in a clockwise direction, driving the gear sector 57 by engagement of the shoulder 61 with the sector pin 59. The sector then drives the piston rod 53 and the piston 49, moving the piston to the extreme right end of the cylinder 48. This causes the split nut to again engage the lead screw 21 and rotates the cross feed shaft 66 until the tool is again in its original cross feed position.

In operating a lathe equipped with a mechanism embodying my invention, a workpiece is inserted between the centers 17 and 18 (Fig. 1), and a driving engagement made between the drive plate 16 and the workpiece. A suitable tool is inserted in the tool post 33, and assuming that threads are now to be cut that terminate at a shoulder, the carriage may be moved to the right so that it will feed toward the headstock 14. It will be appreciated, however, that the carriage may feed from left to right. The cross feed wheel 28 is then manually rotated until the tool is at a proper cross feed position for cutting threads or other cutting operation when the split nut is engaged for driving the carriage. The adjustable stop 47 is positioned at a point that will actuate the pneumatic valve 44 when the cutting tool reaches the position of the shoulder on the workpiece.

The split nut lever 36 is then manually rotated to the right until the shoulder 61 thereon engages the pin 59 of the gear sector 57, causing the gear sector to rotate, and rotating the split nut shaft 58 and simultaneously moving the piston rod 53, together with its piston 49, to the right. This movement of the piston rod also drives through the rack 64 the gears 68 and 69, and through either the gear pair 72, 73 or the single gear 76 to rotate the gear 74, rotating the cross feed shaft 66 to advance the tool to its proper position. The carriage then moves in the selected direction due to the rotation of the lead screw 21 and the thread or other cut is made upon the workpiece. As the carriage moves to the left, assuming that this is the selected carriage direction, the valve actuating lever 50 contacts the adjustable stop 47 and in turn causes a snap action opening of the valve 44. This admits air under pressure through the conduit 46 and into the cylinder 48, snapping the piston 49 to the left, and the piston rod 53 connected thereto rotates the gear sector 57 and actuates the gears within the housing 42. The rotation of the gear sector 57 rotates the split nut shaft 58, causing the split nut to disengage from the lead screw 21, stopping the movement of the carriage. Simultaneously the drive through the gears in the housing 42 rotates the cross feed shaft 66 in a direction to retract the tool very rapidly. This rapid retraction of the tool is enhanced by the use of the large gear 69 driving the smaller gears 72, 73 or 76 and the small cross feed shaft gear 74. This rapid retraction of the tool permits the accurate forming of threads that terminate at a shoulder so that even though the workpiece continues to rotate, the thread will terminate at the shoulder and the tool will not cut across the raised portions of the threads as the workpiece rotates.

If a deeper cut is to be made, or if the same cut is to be made upon a new workpiece, the entire carriage 12 may again be moved to its starting position, either manually by rotating the hand wheel 26, or by power by actuating the clutch lever 34 which causes the feed rod 22 to drive the carriage. Movement of the carriage away from the adjustable stop 47 causes the valve 44 to return to its neutral or closed position wherein it vents the conduit 46 to atmosphere. When the proper starting carriage position is reached, the cutting tool is advanced to cutting position by manual rotation of the cross feed hand wheel 28. This of course rotates the gear train within the housing 42 and moves the rack 53 and piston 49 to the right and rotates the gear sector 57 in a clockwise direction. The lost motion between the shoulders 61, 62 on the hub of the split nut lever 36 and the pin 59, however, permits this operation without causing the split nut to engage. After the operator has adjusted the cutting tool to the desired depth of cut, the split nut lever is then rotated clockwise to engage the nut with the lead screw. The movement of the carriage may be interrupted and the cutting tool simultaneously retracted at any intermediate point by manually tripping the valve trip lever 50 or 150, or by manually rotating the cross feed hand wheel 28. Since the shoulder 62 on the hub of the split nut lever 36 is in engagement with the pin 59, the split nut will be disengaged from the lead screw by rotation of the hand wheel 28 in a direction to retract the cutting tool.

Figure 6:
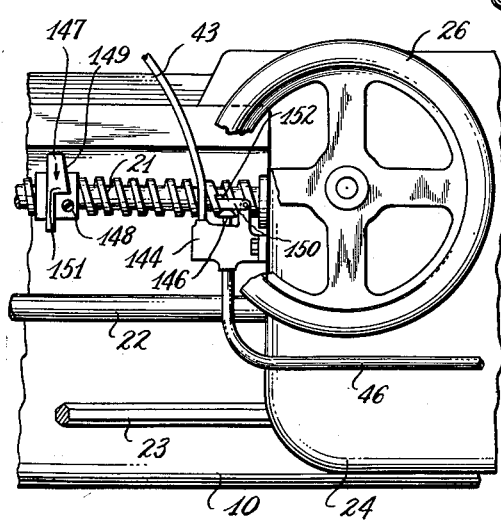
Fig. 6 is a fragmentary elevation view of the lathe bed and carriage incorporating an alternative form of adjustable stop and valve actuated thereby.

Shown in Fig. 6 is a modified form of adjustable stop mechanism for operating the piston cylinder motor for stopping the lathe carriage and automatically retracting the cutting tool. The mechanism of Fig. 6 has the additional advantage over a stationary stop such as stop 47 (Fig. 1) in that it rotates at a fixed position and accordingly may actuate the pneumatic valve in accordance with a rotary position as well as a fixed longitudinal position. This embodiment of my invention may be in the form of an adjustable stop 147 mounted directly on the lead screw 21, and may be threaded thereon if desired and locked in a fixed position by means of a set screw 148 which may contact the root of the threads on the lead screw 21. The stop 147 may be provided with an inclined cam face 149 of substantially the same pitch as the lead screw, terminating in an abrupt shoulder 151. As the lead screw 21 rotates to move the carriage along the ways 11 of the lathe bed 10, the adjustable stop 147 rotates with it, and for normal cutting operations wherein the lathe carriage moves from tailstock to headstock the direction of rotation of the lead screw 21 and the adjustable stop 147 is indicated by the arrow on the adjustable stop. A pneumatic valve 144 may be provided controlling the flow of fluid under pressure from the inlet conduit 43 to the motor conduit 46. The valve 144 may be provided with a push button actuator 146 for the movable valve element such as a poppet, and in turn may be actuated by a lever 150 mounted for rotation on the valve housing. It will be noted that the lever 150 is approximately along the middle of the lead screw 21 and may include an inwardly projecting tip 152 which may be contacted by the shoulder 151 on the rotary stop 147. The valve 144 may be secured as a whole to the apron 24 of the carriage 12.

The operation of the mechanism of Fig. 6 is as follows. The adjustable stop 147 is located on the lead screw 21 at the exact position where it is desired to terminate the threads on a workpiece. The lead screw 21 is then actuated and the cutting movement of the carriage takes place, moving, for example, from right to left. The valve 144 mounted on the apron 24 of the carriage 12 moves along with the carriage until it approaches the adjustable stop 147. If movement of the carriage 12 is such that the projecting tip 152 on the lever 150 just misses the shoulder 151 on the stop, the continued movement of the carriage 12 to the left will not cause the lever 150 to strike the stop 147 because of the inclined cam face 149 on the stop. At the next rotation, however, the carriage will have moved a sufficient distance to the left so that the projecting tip 152 of the lever 150 will be squarely struck by the shoulder 151 on the stop, pushing the pin 146 downwardly and actuating the valve. The downward rotation of the lever 150 upon being struck moves the tip 152 out of the path of the rotating stop 147 so that there can be no damage due to rigid mechanical interference between the rotating stop 147 and the valve lever 150. The flow of fluid to the motor conduit 46 actuates the pneumatic motor to release the split nut and to automatically retract the cutting tool. The carriage is returned to its starting position with the arrangement of Fig. 6 in the same fashion as described in connection with the other figures.

It will be appreciated that the arrangement of Fig. 6 not only gives rise to a rigid stop actuated by longitudinal movement of the carriage, but also gives in effect a micrometer adjustment for the stop because of the rotary motion of the stop 147. The structure of Fig. 6 accordingly provides a very accurate control for the mechanism of my invention.

From the foregoing it is evident that my invention may be applied as an accessory to previously designed lathe carriages. It will be obvious, however, that it may be also integrally designed into the carriage, and that the housings 41 and 42 may form an integral part of the apron 24 of the lathe carriage. While the mechanism is preferably secured to the lathe carriage at present, the same results may be obtained by controls disposed at other portions of the lathe. While I at present prefer to employ a pneumatic drive for my automatic mechanism, it is obvious again that any type of power source may be employed, such as hydraulic fluid, electric motor, etc. Accordingly I do not care to limit myself to the present embodiment of my invention, nor otherwise, except by the terms of the following claims.

I claim:

1. An attachment for a lathe carriage having a traverse feed control and a cross feed comprising a motor mounted on the carriage, a connection between the motor and the cross feed for driving the cross feed in a direction to retract a cutting tool carried thereby, a connection between the traverse feed control and the motor, and a control device associated with the motor whereby operation of the motor simultaneously actuates the traverse feed control to stop the carriage and simultaneously drives the cross feed to retract the cutting tool.

2. An attachment for a lathe carriage having a traverse feed lever and a cross feed shaft comprising a gear sector secured to the lever, a gear secured to the shaft, a housing having a cylinder formed therein, a piston disposed in the cylinder, and a piston rod passing through the housing and having a first rack formed thereon for engaging the sector to rotate the lever and having a second rack formed thereon for driving the shaft gear.

3. A lathe comprising a lathe bed, a carriage adapted to move along the bed, a lead screw secured to the lathe bed for rotation thereon, means carried by the carriage for engaging the lead screw, a cross feed mounted on the carriage, a motor mounted on the carriage for simultaneously actuating the engaging means and the cross feed, an adjustable stop secured to the lead screw and having an inclined face substantially of the same pitch as the lead screw and terminating in an abrupt shoulder, and power control means mounted on the end of the carriage adjacent to the adjustable stop and having an element adapted to be engaged by the shoulder of the adjustable stop when the carriage has moved to a position to engage the element and the shoulder.

4. A lathe comprising a bed, a carriage adapted to move along the bed, a driving member for moving the carriage along the bed, means carried by the carriage for engaging the driving member, a cross slide carried by the carriage and adapted to carry a tool, a cylinder-piston motor supported by the carriage, a coupling between the motor and the cross slide for driving the cross slide under power, a coupling between the carriage drive engaging means and the motor, and a motor control operable upon the carriage reaching a predetermined position for causing the motor to uncouple the carriage and drive said cross slide to stop the carriage and retract the cutting tool.

5. In a lathe, the combination of a lathe carriage, power engaging means on the carriage for moving the carriage, a cross slide mounted on the carriage and adapted to carry a cutting tool, a fluid motor mounted on the carriage, a coupling between the motor and the cross slide for driving the cross slide, a coupling between the carriage power engaging means and the motor, and a fluid control valve connected to the motor and adapted to be operated when the carriage is moved to a preselected point, to cause operation of the motor to simultaneously uncouple the carriage and drive the cross slide in a direction to retract the cutting tool.

CHARLES A. BAILLOD.

(References on following page)

REFERENCES CITED

The following references are of record in the file of this patent:

UNITED STATES PATENTS

| Number | Name | Date |
|---|---|---|
| 834,359 | Buckley | Oct. 30, 1906 |
| 964,752 | Cartwright | July 19, 1910 |
| 1,197,541 | Potter | Sept. 5, 1916 |
| 1,481,706 | Goodwin | Jan. 22, 1924 |
| 2,063,414 | Tweddell | Dec. 8, 1936 |
| 2,101,754 | Randall | Dec. 7, 1937 |
| 2,118,489 | Carter | May 24, 1938 |
| 2,259,472 | Johnson | Oct. 21, 1941 |
| 2,370,032 | Groen | Feb. 20, 1945 |

FOREIGN PATENTS

| Number | Country | Date |
|---|---|---|
| 65,836 | Germany | Dec. 3, 1892 |
| 89,008 | Germany | Nov. 16, 1896 |
| 344,786 | Germany | Nov. 30, 1921 |